Oct. 13, 1925.

W. S. WHITTAKER

STEERING WHEEL

Filed Dec. 24, 1923

1,557,225

Inventor.
W. S. Whittaker
By Spencer, Sewall & Hardman
his Attorneys.

Patented Oct. 13, 1925.

1,557,225

UNITED STATES PATENT OFFICE.

WALLACE S. WHITTAKER, OF DAYTON, OHIO, ASSIGNOR TO THE INLAND MANUFACTURING COMPANY, OF DAYTON, OHIO, A CORPORATION OF DELAWARE.

STEERING WHEEL.

Application filed December 24, 1923. Serial No. 682,366.

*To all whom it may concern:*

Be it known that I, WALLACE S. WHITTAKER, a citizen of the United States of America, residing at Dayton, county of Montgomery, and State of Ohio, have invented certain new and useful Improvements in Steering Wheels, of which the following is a full, clear, and exact description.

This invention relates to handwheels particularly such as are employed as steering wheels on automotive vehicles of various kinds.

An object of this invention is to provide a simple, economical and well appearing spider construction for handwheels and one which is exceptionally strong for spiders composed of separate spokes held in a metallic hub.

Another object is to provide a handwheel which has no exposed metal parts when viewed from its top side and hence the appearance of the wheel is greatly improved.

Further objects and advantages of the present invention will be apparent from the following description, reference being had to the accompanying drawings, wherein a preferred form of embodiment of the present invention is clearly shown.

In the drawings.

Similar reference characters refer to similar parts throughout the several views.

Figure 1:
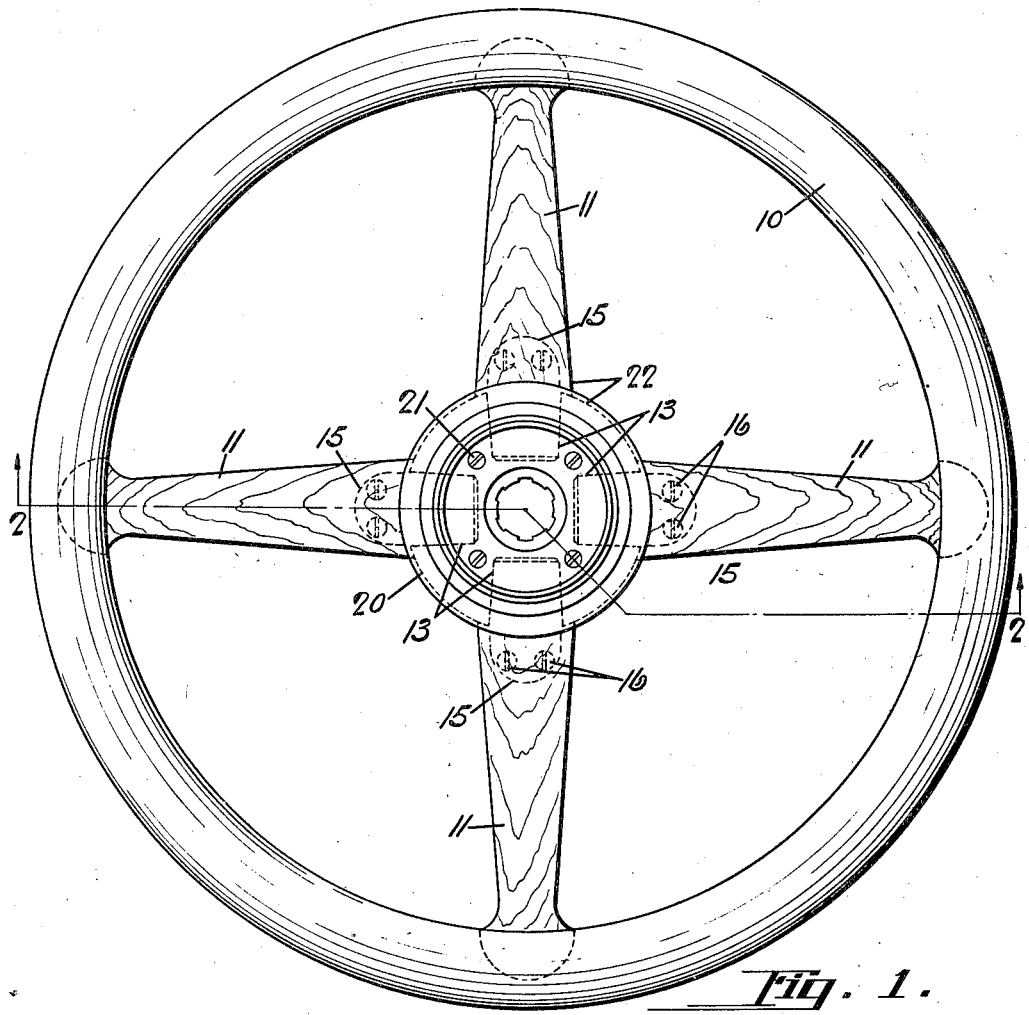
Fig. 1 is a plan view of a steering wheel built according to this invention.
Figure 2:
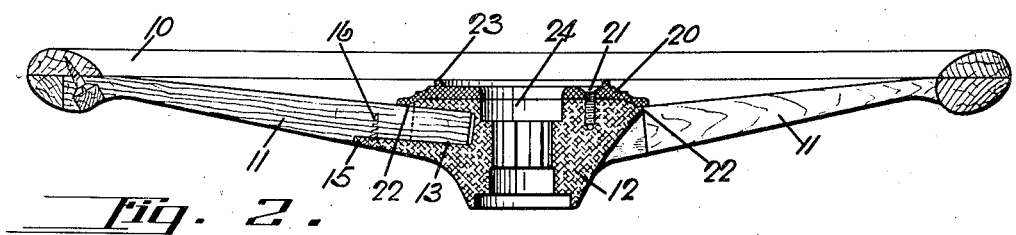
Fig. 2 is a sectional view thereof along line 2—2 of Fig. 1.

Numeral 10 designates the wood rim of the wheel and 11 the wood spokes. The hub 12 is of cast metal, preferably aluminum, and is provided with radial recesses 13 into which the reduced end portions of the spokes 11 are inserted, preferably with a driving fit. So much of the steering wheel so far described is well known in the art and is not herein claimed. An important feature of this invention however is the lower projecting lip 15, preferably integral with the hub 12, which extends radially outwardly along the under side of each spoke 11 and supports the same at a much greater distance out from the center than is ordinarily the case. By this means the wheel is made much stronger for withstanding both torque and axial stresses and yet the apparent diameter of the hub, when viewed from above, may be made as small as desired for appearance's sake. Preferably the lip 15 is sunk into the wood of the spoke so that its bottom surface lies flush with that of the spoke, as clearly shown in Fig. 2. The two wood screws 16 extend upwardly into each spoke 11 near the outer end of the lip 15 and so securely attach the spokes to the hub 12.

The cover plate 20 is preferably molded of hard rubber, bakelite, or some similar material and secured to the top of hub 12 by means of the screws 21 as clearly shown in the drawings. The cover plate 20 may be molded in any desired surface form and contour and in any desired color, to give an artistic appearance to the central portion of the spider. Since the top part of the hub 12 is covered by the plate 20 it is unnecessary to machine or polish the top surface of the hub. Also since the plate 20 covers the joints 22 between the hub 12 and the spokes 11 it is not necessary that this joint be very accurately fitted. Hence a considerable saving can be made in the cost of the wheel by the use of the molded plate 20 and at the same time the good appearance of the wheel may be greatly increased by artistically formed or colored plates. In the form shown in the drawings the annular ridge 23 serves as a pilot for a housing cap (not shown) covering the nut on the end of the steering column or covering switch or control lever mechanism which may be located at the end of the steering column. If desired, the hub 12 may be designed with a recess 24 large enough to receive the nut which holds the wheel on the steering column and the cover plate 20 may then completely cover said nut and the entire hub 12, in which case no housing cap will be used.

While the form of embodiment of the present invention as herein disclosed, constitutes a preferred form, it is to be understood that other forms might be adopted, all coming within the scope of the claims which follow.

What is claimed is as follows:

1. A steering wheel having a rim and a plurality of wooden spokes, and a metal spider hub having sockets therein for receiving the inner ends of said spokes, said hub having projections extending outwardly along the under side of said spokes beyond the periphery of the upper portion of said hub, and rigidly secured to said wooden spokes.

2. A steering wheel having a rim and a plurality of wooden spokes, and a metal spider hub having sockets therein for receiving the inner ends of said spokes, said hub having projections extending outwardly along the under side of said spokes and rigidly secured thereto at a greater radial distance from the center than the periphery of the upper portion of said hub.

3. A steering wheel having a rim and a plurality of wood spokes, a metal hub having sockets therein for receiving the inner ends of said spokes, said hub having a projecting lip attached to the under side of each spoke, whereby the effective diameter of said hub for holding said spokes is increased while the apparent diameter thereof as viewed from above remains small.

4. A steering wheel having a rim and a spider, said spider including a metal hub, a plurality of separate spokes rigidly secured thereto, and a molded non-metallic cover plate secured to and concealing said hub.

5. A steering wheel having a rim and a spider, said spider including a metal hub, a plurality of separate spokes rigidly secured thereto, and a molded non-metallic cover plate secured to and concealing said hub, and the joint between said hub and spokes.

6. A steering wheel having a rim and a spider, said spider comprising a metal hub and a plurality of separate wooden spokes secured thereto, and a molded non-metallic cover plate secured to said spider and concealing said hub, whereby all metal parts of said spider are concealed when viewed from above.

In testimony whereof I hereto affix my signature.

WALLACE S. WHITTAKER.